United States Patent
Amano

(10) Patent No.: US 10,872,020 B2
(45) Date of Patent: Dec. 22, 2020

(54) STORAGE APPARATUS AND RECORDING MEDIUM STORING BACKUP PROGRAM

(71) Applicant: FUJITSU LIMITED, Kawasaki (JP)

(72) Inventor: Kazuhiko Amano, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 16/161,135

(22) Filed: Oct. 16, 2018

(65) Prior Publication Data
US 2019/0121708 A1 Apr. 25, 2019

(30) Foreign Application Priority Data

Oct. 20, 2017 (JP) .................... 2017-204011

(51) Int. Cl.
*G06F 11/20* (2006.01)
*G06F 13/40* (2006.01)

(52) U.S. Cl.
CPC ...... *G06F 11/2015* (2013.01); *G06F 13/4022* (2013.01); *G06F 2201/805* (2013.01)

(58) Field of Classification Search
CPC .............................. G06F 11/2015; G06F 1/30
See application file for complete search history.

(56) References Cited

U.S. PATENT DOCUMENTS

| | | | |
|---|---|---|---|
| 2010/0194341 A1 | 8/2010 | Anupindi et al. | |
| 2010/0332897 A1* | 12/2010 | Wilson | G06F 11/2015 714/14 |
| 2011/0058440 A1* | 3/2011 | Smith | G06F 11/3034 365/229 |
| 2012/0096229 A1* | 4/2012 | Fujii | G06F 12/0866 711/159 |
| 2013/0007515 A1* | 1/2013 | Shaw | G06F 1/3206 714/14 |
| 2013/0047030 A1* | 2/2013 | Soeda | G06F 1/263 714/14 |
| 2013/0086344 A1* | 4/2013 | Kawada | G06F 11/2064 711/162 |
| 2014/0006834 A1* | 1/2014 | Ishii | G06F 11/1441 713/340 |
| 2014/0289562 A1* | 9/2014 | Ozawa | G06F 11/0751 714/37 |

FOREIGN PATENT DOCUMENTS

| | | |
|---|---|---|
| JP | 2006-163455 | 6/2006 |
| JP | 2011-509061 | 3/2011 |

* cited by examiner

*Primary Examiner* — Yolanda L Wilson
(74) *Attorney, Agent, or Firm* — Fujitsu Patent Center

(57) ABSTRACT

A storage apparatus includes, a determination circuit that determines a path between one of a plurality of backup power sources and one of a plurality of backup target circuits each of the plurality of backup power sources including a memory based on configuration information, state information of the storage apparatus, and setting information of performance request for the storage apparatus, a plurality of switches arranged between the plurality of backup target circuits and the plurality of backup power sources, and a control circuit that controls the switches to couple the backup target circuit to the backup power source via the path determined by the determination circuit.

4 Claims, 12 Drawing Sheets

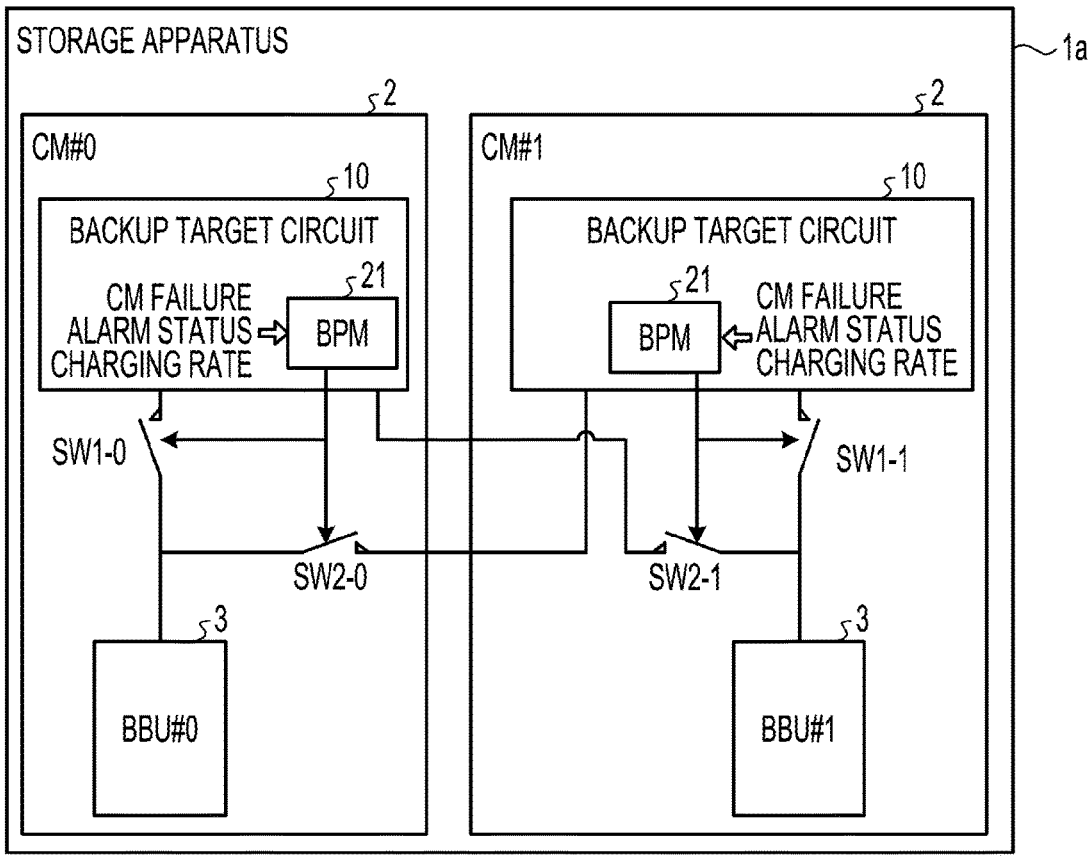

FIG. 5

| A_1 UNIT NAME | B_1 MOUNT/ UNMOUNT | C_1 BACKUP TARGET | D_1 POWER CONSUMPTION (W) | E_1 PHYSICAL CACHE SIZE (GB) | F_1 USER CACHE SIZE (GB) | G_1 ACCESS RATE (MB/s) | H_1 STATE |
|---|---|---|---|---|---|---|---|
| CM#0 | 1 | Yes | 30 | 32 | 16 | 200 | READY |
| CM#1 | 1 | Yes | 30 | 32 | 16 | 200 | READY |
| CM#2 | 0 | N.A. | 35 | 64 | N.A. | 160 | False |
| CM#3 | 0 | N.A. | 35 | 64 | N.A. | 160 | False |
| CM#4 | 0 | N.A. | 40 | 128 | N.A. | 180 | False |
| CM#5 | 0 | N.A. | 40 | 128 | N.A. | 180 | False |
| CM#6 | 0 | N.A. | 25 | 16 | N.A. | 180 | False |
| CM#7 | 0 | N.A. | 25 | 16 | N.A. | 180 | False |

FIG. 6

| A_2 UNIT NAME | B_2 MOUNT/ UNMOUNT | C_2 CURRENT CAPACITY (mAh) | D_2 VOLTAGE (V) | E_2 SoC(%) | F_2 TOTAL CAPACITY | G_2 TOTAL OUTPUT CURRENT (A) | H_2 STATE |
|---|---|---|---|---|---|---|---|
| BBU#0 | 1 | 3,200 | 12 | 50 | 38.4 | 7 | READY |
| BBU#1 | 1 | 3,200 | 12 | 50 | 38.4 | 7 | READY |
| BBU#2 | 1 | 3,200 | 12 | 50 | 38.4 | 7 | READY |
| BBU#3 | 0 | 1,000 | 8.4 | N.A. | 8.4 | 5 | False |
| BBU#4 | 0 | 1,000 | 8.4 | N.A. | 8.4 | 5 | False |
| BBU#5 | 0 | 7,200 | 8.4 | N.A. | 60.48 | 5 | False |
| BBU#6 | 0 | 7,200 | 8.4 | N.A. | 60.48 | 5 | False |
| BBU#7 | 0 | 7,200 | 8.4 | N.A. | 60.48 | 5 | False |
| CAP#0 | 0 | 400 | 7.5 | N.A. | 3 | 10 | False |
| CAP#1 | 0 | 400 | 7.5 | N.A. | 3 | 10 | False |
| CAP#2 | 0 | 400 | 7.5 | N.A. | 3 | 10 | False |
| CAP#3 | 0 | 400 | 7.5 | N.A. | 3 | 10 | False |

FIG. 7

| PATTERN NAME | CM #0 | CM #1 | CM #2 | ... | CM #n | (I) P(CM#0) + P(CM#1) +...+P(CM#n) | BBU #0 | BBU #1 | BBU #2 | ... | BBU #m | ΣP(BBU#0-m) (II) Current | ΣP(BBU#0-m) Full | USABILITY (II)-(I)>0 | Note |
|---|---|---|---|---|---|---|---|---|---|---|---|---|---|---|---|
| PATTERN NAME#0 | 1 | 1 | 1 | ... | 1 | 105 | 1 | 1 | 1 | ... | 0 | 57.6 | 115.2 | NG | DEFAULT PATH |
| PATTERN NAME#1 | 1 | 0 | 0 | ... | 0 | 35 | 1 | 1 | 1 | ... | 0 | 57.6 | 115.2 | OK | CM#0 FIRST |
| PATTERN NAME#2 | 0 | 1 | 0 | ... | 0 | 35 | 1 | 1 | 1 | ... | 0 | 57.6 | 115.2 | OK | CM#1 FIRST |
| PATTERN NAME#3 | 0 | 0 | 1 | ... | 0 | 35 | 1 | 1 | 1 | ... | 0 | 57.6 | 115.2 | OK | |
| PATTERN NAME#4 | 0 | 0 | 0 | ... | 1 | 35 | 1 | 1 | 1 | ... | 0 | 57.6 | 115.2 | OK | |
| | | | | ... | | | | | | ... | | | | | |
| PATTERN NAME#5 | 1 | 1 | 0 | ... | 0 | 70 | 1 | 1 | 1 | ... | 0 | 57.6 | 115.2 | NG | |
| PATTERN NAME#6 | 0 | 1 | 1 | ... | 0 | 70 | 1 | 1 | 1 | ... | 0 | 57.6 | 115.2 | NG | |
| PATTERN NAME#7 | 0 | 0 | 1 | 1 | 0 | 70 | 1 | 1 | 1 | ... | 0 | 57.6 | 115.2 | NG | |

FIG. 8

| TYPE NAME | SHORTEST CACHE USABLE TIME(I) | CACHE SIZE ENLARGEMENT (II) | OPERATIONAL STABILITY OF DEVICE (III) | IMPORTANCE OF BATTERY LIFE(IV) | | SUM |
|---|---|---|---|---|---|---|
| DEFAULT | 10 | 10 | 70 | 10 | ... | 100 |
| TYPE#1 | 70 | 10 | 10 | 10 | ... | 100 |
| TYPE#2 | 40 | 40 | 10 | 10 | ... | 100 |
| TYPE#3 | 10 | 0 | 50 | 40 | ... | 100 |
| TYPE#4 | 40 | 30 | 30 | 0 | ... | 100 |
| TYPE#5 | 40 | 60 | 0 | 0 | ... | 100 |

STORAGE APPARATUS AND RECORDING MEDIUM STORING BACKUP PROGRAM

CROSS-REFERENCE TO RELATED APPLICATION

This application is based upon and claims the benefit of priority of the prior Japanese Patent Application No. 2017-204011, filed on Oct. 20, 2017, the entire contents of which are incorporated herein by reference.

FIELD

The embodiments discussed herein are related to a storage apparatus and a recording medium storing a backup program.

BACKGROUND

The redundant arrays of inexpensive disks (RAID) device include within the device a dedicated power storage apparatus which backs up data of a volatile memory to a nonvolatile storage medium in order to protect user data in the device during a power outage without an external power source such as an uninterruptible power supply device. In a case where the dedicated power storage apparatus is, for example, a secondary power storage battery, when the device is not energized for a long time, or when the device is restarted after a battery discharge immediately after a power outage, data may not be backed up on a volatile memory because charging is insufficient.

In addition, in a battery backup state of a redundant system driven by two batteries, when a failure occurs in one of the batteries, there is a technology that controls a control switch which connects two batteries with two devices to drive only one device with a normal battery. With this technology, it is possible to secure backup time even when a failure occurs in one of the batteries, thereby avoiding data loss or the like.

Related technologies are disclosed in, for example, Japanese Laid-Open Patent Publication No. 2006-163455 and Japanese National Publication of International Patent Application No. 2011-509061.

SUMMARY

According to an aspect of the embodiments, a storage apparatus includes, a determination circuit that determines a path between one of a plurality of backup power sources and one of a plurality of backup target circuits each of the plurality of backup power sources including a memory based on configuration information, state information of the storage apparatus, and setting information of performance request for the storage apparatus, a plurality of switches arranged between the plurality of backup target circuits and the plurality of backup power sources, and a control circuit that controls the switches to couple the backup target circuit to the backup power source via the path determined by the determination circuit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 2A and 2B are diagrams illustrating another example of the backup path control;

FIG. 5 is a diagram illustrating an example of a control module (CM) configuration table;

FIG. 6 is a diagram illustrating an example of a battery backup unit (BBU) configuration table;

FIG. 7 is a diagram illustrating an example of a pattern table;

FIG. 8 is a diagram illustrating an example of a performance request table;

DESCRIPTION OF EMBODIMENTS

A storage apparatus provided with a secondary storage battery for backup has a problem that it is not possible to control a backup path according to a performance request of a user, the state of the secondary battery, and the state of a control device that controls the storage apparatus. For example, in a storage apparatus having a redundant configuration equipped with a plurality of storage control apparatuses (control module (CM)), even when there is a failed CM, the CM and the secondary storage battery are connected so that all the CMs are backed up equally. Further, even when a user intends to use a cache memory in an early stage, it is not possible to make an early use of the cache memory by controlling only one CM to be backed up while the secondary storage battery is insufficiently charged.

Hereinafter, embodiments of a storage apparatus and a backup program described by the present disclosure will be described in detail with reference to the accompanying drawings. The embodiments do not limit the technology disclosed herein.

[Embodiment]

Figures 1A, 1B:
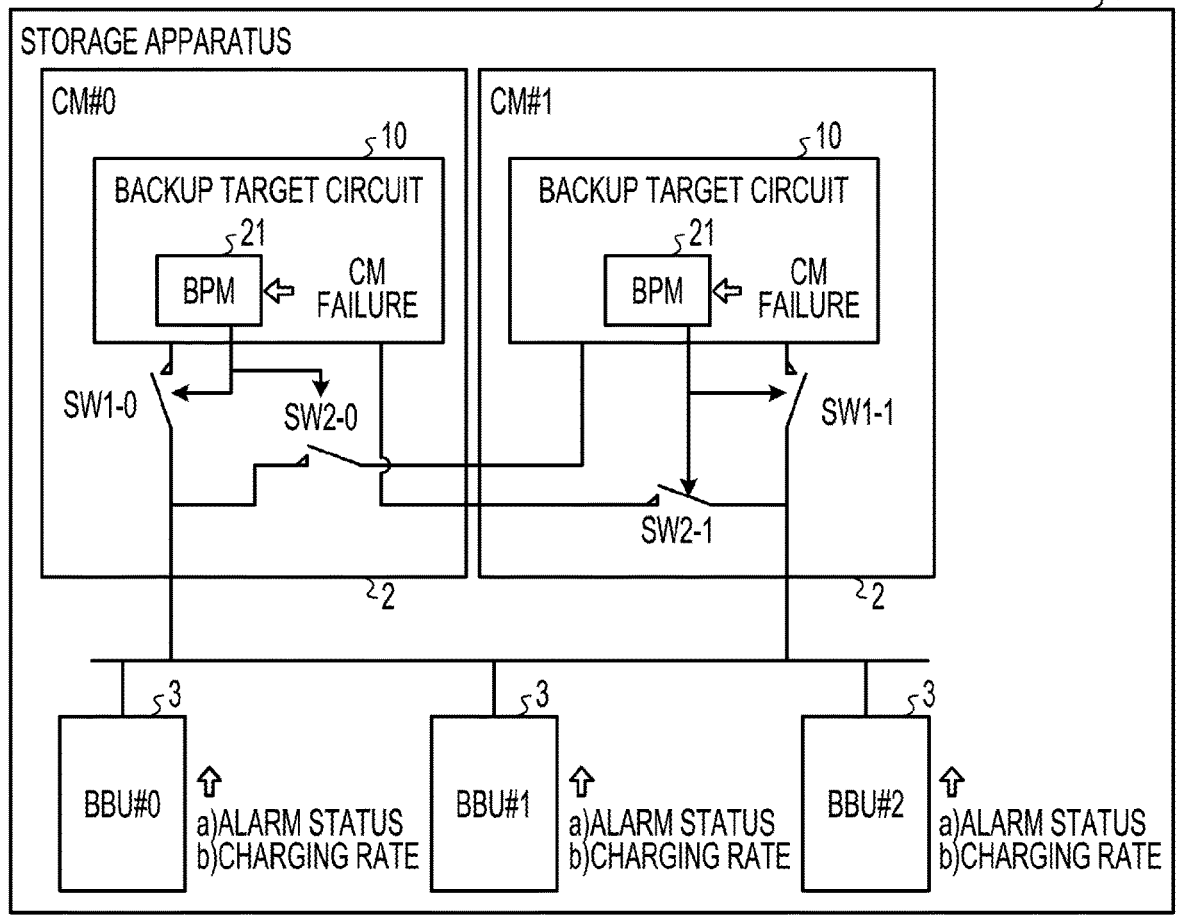
FIGS. 1A and 1B are diagrams illustrating an example of a backup path control according to an embodiment.

First, an example of a backup path control according to an embodiment will be described. FIGS. 1A and 1B are diagrams illustrating an example of a backup control according to the embodiment. FIG. 1A illustrates a backup configuration. As illustrated in FIG. 1A, a storage apparatus 1 includes two CMs 2 represented by CM #0 and CM #1, and three battery backup units (BBUs) 3 represented by BBU #0 to BBU #2. The CM 2 is a device that controls the storage apparatus 1. The BBU 3 is a battery that supplies power to the CM 2 in the event of a power failure or power outage.

In FIG. 1A, three BBUs 3 back up two CMs 2. Further, in FIG. 1A, two CMs 2 are backed up by three BBUs 3, but in general, a number of N CMs 2 is backed up by a number of (N+1) BBUs.

The BBU 3 supplies power to a backup target circuit 10 included in the CM 2 in the event of a power failure or power outage. The backup target circuit 10 includes a backup path manager (BPM) 21. The BPM 21 of CM #0 controls the backup path (path) by turning ON/OFF the switches represented by SW1-0 and SW2-0. The BPM 21 of CM #1 controls the backup path by turning ON/OFF the switches represented by SW1-1 and SW2-1.

The BPM 21 acquires an alarm status (error information) and a charging rate from each BBU 3. Further, the BPM 21 acquires the state information of each CM 2. Then, the BPM 21 determines the ON/OFF of the switch based on the alarm status, the charging rate, and the state of each CM 2 acquired from each BBU 3.

FIG. 1B illustrates an operation mode based on the ON/OFF of each switch with respect to the storage apparatus 1. As illustrated in FIG. 1B, in the case of operation mode 1 in which the power path is fixed, the switch is set to type 1, and the storage apparatus 1 turns ON the SW1-0 and the SW1-1 and turns OFF the SW2-0 and the SW2-1 so that power is supplied from the entire BBU 3 uniformly to the entire CM 2.

In the case of operation mode 2 in which the power of the entire BBU 3 is concentrated on CM #0, the switch is set to either type 2 in which the performance request is emphasized or type 3 when CM #1 fails. Type 2 in which the performance request is emphasized depends on a setting by a predetermined performance request of the user (to be described later). Setting examples of the performance request include a case where when the backup target of the power is only CM #0, the usable time of the BBU 3 is set to be the shortest, a case where in the setting of emphasizing the user cache area of the cache of CM #0, the user cache area is enlarged from a predetermined size, and the like. In the switch settings of type 2 and type 3, the storage apparatus 1 turns ON the SW1-0 and the SW2-1 and turns OFF the SW1-1 and the SW2-0. Also, in a state where the SW1-0 fails and is turned OFF, the storage apparatus 1 turns ON the SW2-1 and turns OFF the SW1-1 and the SW2-0.

The usable time of the BBU 3 is determined by the alarm status and the charging rate of each BBU 3. When the BBU 3 becomes usable, the cache memory of the CM 2 becomes usable. Therefore, since the time from the write through to the write back may be shortened, the shortest usable time of the BBU 3 is prepared for the entry of the performance request.

In the case of operation mode 3 in which the power of the entire BBU 3 is concentrated on CM #1, the switch is set to either type 4 in which the performance request is emphasized or type 5 which is the type when CM #0 fails. Type 4 in which the performance request is emphasized depends on the setting by a predetermined performance request of a user (to be described later). Setting examples of the performance request include a case where when the backup target of the power is CM #1, the usable time of the BBU 3 is set to be the shortest, a case where in the setting of emphasizing the user cache area of the cache of CM #1, the size of the user cache area is enlarged from a predetermined size, and the like. In the switch settings of type 4 and type 5, the storage apparatus 1 turns ON the SW1-1 and the SW2-0 and turns OFF the SW1-0 and the SW2-1. Also, in a state in which the SW1-1 fails and is turned OFF, the storage apparatus 1 turns OFF the SW1-0, turns ON the SW2-0, and turns OFF the SW2-1.

In this way, the BPM 21 determines the backup path for the CM 2 by determining the ON/OFF of the switch based on the setting of the user's performance request, the alarm status and the charging rate acquired from each BBU 3, and the state of each CM 2.

FIGS. 2A and 2B are diagrams illustrating another example of the backup path control. FIGS. 2A and 2B illustrate a case where the CM 2 and the BBU 3 correspond to each other and each CM 2 is backed up by two BBUs 3.

FIG. 2A illustrates a backup configuration. As illustrated in FIG. 2A, a storage apparatus 1a includes two CMs 2 represented by CM #0 and CM #1, and two BBUs 3 represented by BBU #0 and BBU #1.

In FIG. 2A, two BBUs 3 back up two CMs 2. FIG. 2B illustrates an operation mode. As illustrated in FIG. 1B, in the case of operation mode 1 in which the power path is fixed, the switch is set to type 1, and the storage apparatus 1a turns ON the SW1-0 and the SW1-1 and turns OFF the SW2-0 and the SW2-1 so that power is supplied from the entire BBU 3 uniformly to the entire CM 2.

In the case of operation mode 2, the switch is set to type 2, and the storage apparatus 1a turns ON the SW1-0 and the SW2-1, and turns OFF the SW1-1 and the SW2-0 so that the power of the entire BBU 3 is concentrated on CM #0. Also, in a state where the SW1-0 fails and is turned OFF, the storage apparatus 1 turns ON the SW2-1 and turns OFF the SW1-1 and the SW2-0. In the case of operation mode 3, the switch is set to type 3, and the storage apparatus 1 turns ON the SW1-1 and the SW2-0, and turns OFF the SW1-0 and SW2-1 so that the power of the entire BBU 3 is concentrated on CM #1. Also, in a state in which the SW1-1 fails and is turned OFF, the storage apparatus 1 turns OFF the SW1-0, turns ON the SW2-0, and turns OFF the SW2-1.

Figure 3:
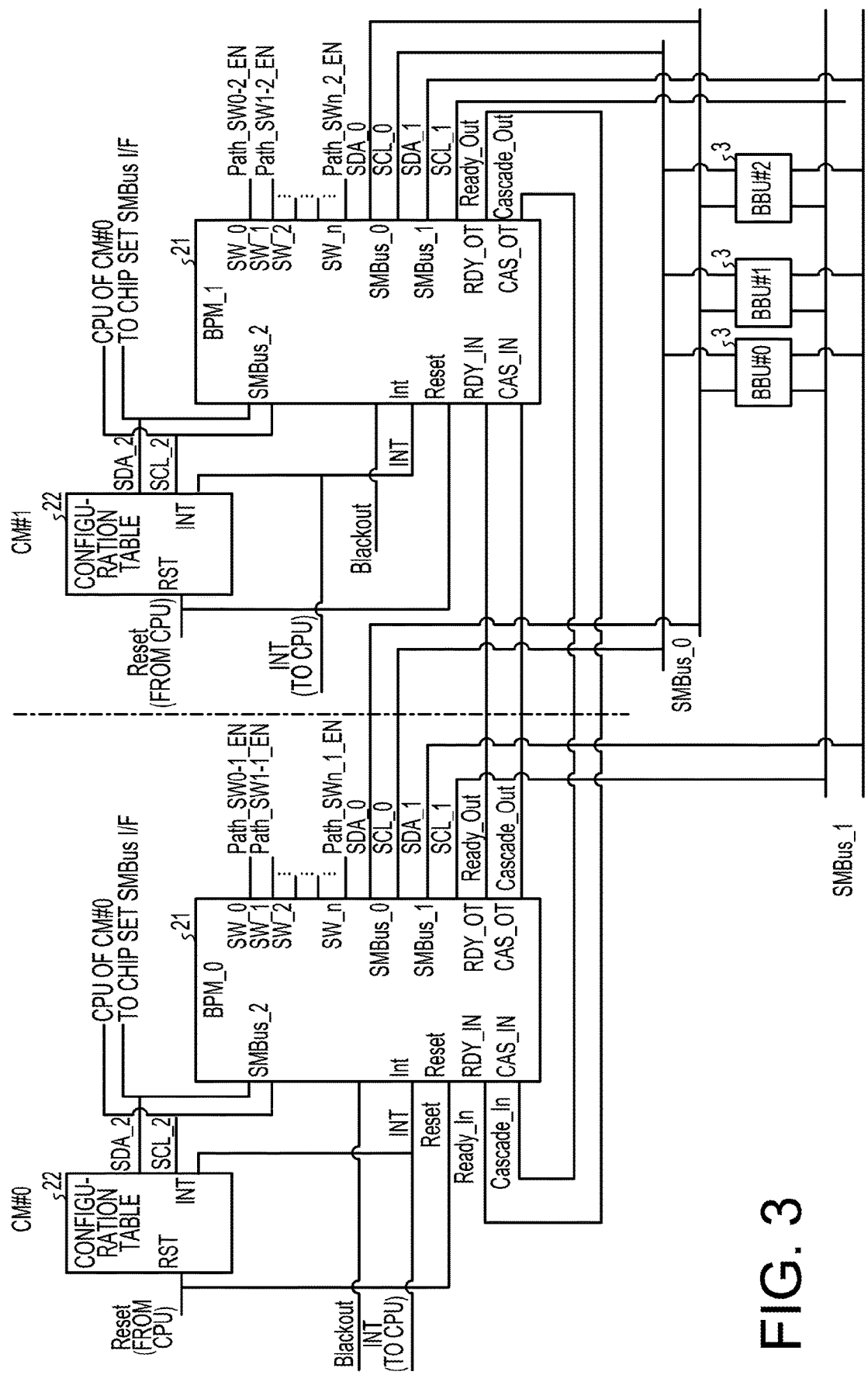
FIG. 3 is a diagram illustrating the configuration of a backup path manager (BPM)

Next, the configuration of the BPM 21 will be described. FIG. 3 is a diagram illustrating the configuration of a BPM. In FIG. 3, the BPM 21 of CM #0 is represented by BPM_0, and the BPM 21 of CM #1 is represented by BPM_1. Since BPM_0 and BPM_1 have the same configuration, BPM_0 will be described here.

As illustrated in FIG. 3, BPM_0 includes output ports SW_0 to SW_n that switch the backup paths and three serial buses SMBus_0 to SMBus_2. SW_0 to SW_n control the ON/OFF of each switch by outputting signals Path_SW0-1_EN to Path_SWn−1_EN to the switches SW0-1 to SWn−1, respectively.

SMBus_2 is connected to the central processing unit (CPU) of CM #0 and the SMBus I/F of a chip set. Further, the SMBus_2 is connected to a configuration table 22. BPM_0 accesses the configuration table 22 by an SDA_2 signal and an SCL_2 signal. In the configuration table 22, the configuration information of the CM 2 of the storage apparatus 1, the configuration information of the BBU 3, the control information of the switch, the performance request of the user, and the like are registered. The configuration information of the CM 2, the configuration information of the BBU 3, and the like are acquired from the configuration information table of the storage apparatus 1.

SMBus_0 and SMBus_1 are connected to the BBU 3, and BPM_0 acquires the error information and charging amount of the BBU 3 using SMBus_0 (the SDA_0 signal and the SCL_0 signal) or SMBus_1 (the SDA_1 signal and the SCL_1 signal). The access order of SMBus_0 and SMBus_1 of a plurality of BPMs 21 in the storage apparatus 1 is adjusted by RDY_IN, RDY_OT, CAS_IN, and CAS_OT. The Ready_Out signal output by RDY_OT is the Ready_In signal of RDY_IN of the other BPM 21. The Cascade_Out signal output by CAS_OUT is the Cascade_In signal of the other BPM 21. In addition, it is possible to switch by the failure of the BPM 21, the failure of the CM 2, and the path failure of the SMBus.

The symbol "INT" is an interrupt signal from the BPM 21 to the CPU. The BPM 21 interrupts the CPU when an event or an error occurs. The interrupt factor is stored in a predetermined area of the configuration table 22.

The symbol "Reset" is asserted from the CPU when the CPU rewrites the setting of the configuration table 22 or when an error of the CM 2 occurs. When the BPM 21 receives the "Reset" signal, the BPM 21 reloads the configuration table 22 and performs an operation according to the contents thereof.

The symbol "Blackout" is a signal that notifies the occurrence of power outage. In the BPM 21, "Blackout" has a role of the mask signal of an operation and a role of a reset signal after release.

Figure 4:
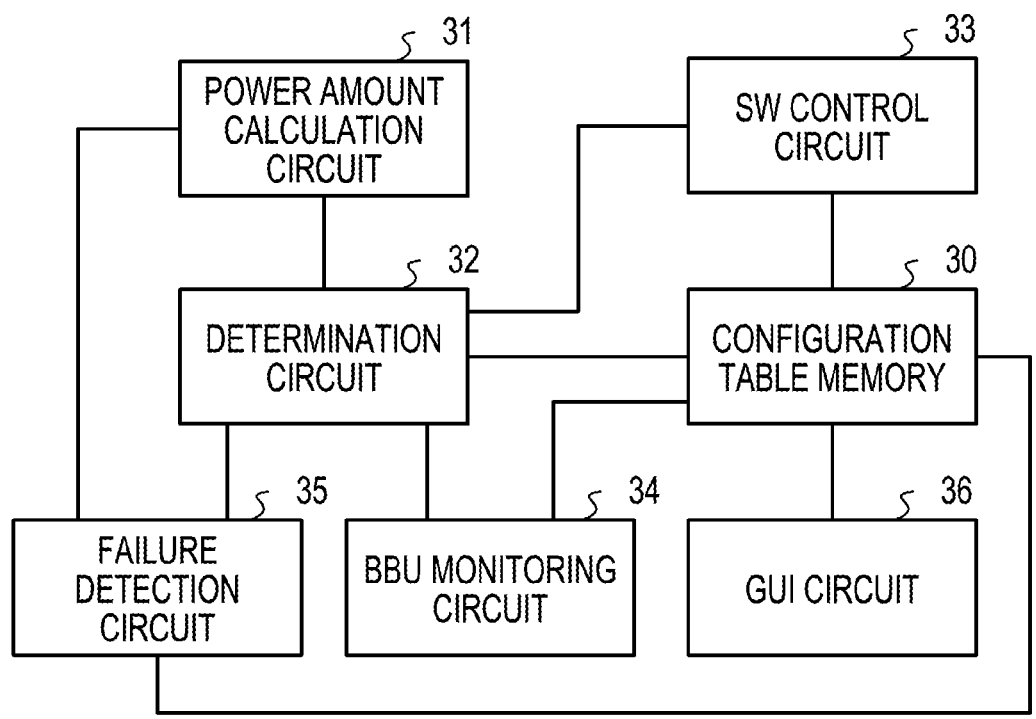
FIG. 4 is a diagram illustrating a functional configuration of the BPM.

Next, a functional configuration of the BPM 21 will be described. FIG. 4 is a diagram illustrating the functional configuration of the BPM 21. As illustrated in FIG. 4, a program is executed in the BPM 21, whereby the functions of a configuration table memory 30, a power amount calculation circuit 31, a determination circuit 32, a SW control circuit 33, a BBU monitoring circuit 34, a failure detection circuit 35, and a GUI circuit 36 are implemented.

The configuration table memory 30 stores information of the configuration table 22. The configuration table 22 includes a CM configuration table, a BBU configuration table, a pattern table, and a performance request table.

The CM configuration table is a table in which the configuration information and the state information of the CM 2 are registered. FIG. 5 is a diagram illustrating an example of the CM configuration table. As illustrated in FIG. 5, the CM configuration table includes a unit name A_1, a mount/unmount B_1, a backup target C_1, a power consumption D_1, a physical cache size E_1, and a user cache size F_1. Further, the CM configuration table includes an access rate G_1 and a state H_1.

The unit name is a name that identifies CM 2. The mount/unmount indicates (1) in which the CM 2 is mounted on the storage apparatus 1 or (0) in which the CM 2 is not mounted thereon. The backup target indicates whether the CM 2 is the target of backup ("Yes") or not ("N.A."). The power consumption is the power consumption of the CM 2. The unit is watts (W).

The physical cache size is the size of a cache memory. The unit is gigabytes (GB). The user cache size is the size of the cache memory used for user data. The unit is gigabytes (GB). The access rate is the access rate of the cache memory. The unit is megabytes (MB)/second (s). The state indicates whether the CM 2 is normal ("READY") or not ("False").

For example, the CM 2 identified as "CM #0" is mounted on the storage apparatus 1, a backup target, and normal. The power consumption of the CM 2 identified as "CM #0" is 30 W, the physical cache size is 32 GB, the user cache size is 16 GB, and the access rate is 200 MB/s.

The BBU configuration table is a table in which the configuration information and the status information of the BBU 3 are registered. FIG. 6 is a diagram illustrating an example of the BBU configuration table. As illustrated in FIG. 6, the BBU configuration table includes a unit name A_2, a mount/unmount B_2, a current capacity C_2, a voltage D_2, a state of charge (SoC) E_2, and a total capacity F_2. Also, the BBU configuration table includes a total output current G_2 and a state H_2.

The unit name is a name that identifies the BBU 3. The symbol "CAP" indicates that the element is a capacitor. The mount/unmount indicates (1) in which the BBU 3 is mounted on the storage apparatus 1 or (0) in which the CM 2 is not mounted thereon. The current capacity is the output current amount of the BBU 3. The unit is milliampere-hour (mAh). The voltage is the output voltage of the BBU 3. The unit is volts (V). The symbol SoC is the charging rate. The unit is %. The total capacity is the total capacity of the BBU 3. The total output current is the maximum output current. The unit is amperes (A). The status indicates whether the BBU 3 is normal ("READY") or not ("False").

For example, the BBU 3 identified as "BBU #0" is mounted on the storage apparatus 1 and is normal. The current capacity of the BBU 3 identified as "BBU #0" is 3,200 mAh, the voltage is 12 V, the charging rate is 50%, the total capacity is 38.4, and the total output current is 7 A.

The pattern table is a table in which a connection pattern of the BBU 3 and the CM 2 is registered. FIG. 7 is a diagram illustrating an example of the pattern table. As illustrated in FIG. 7, the pattern table includes a pattern name, CM #0 to CM #n, P(CM #0)+P(CM #1)+ . . . +P(CM #n), BBU #0 to BBU #m, ΣP(BBU #0m), usability, and notes.

The pattern name is a name that identifies a pattern. CM #0 to CM #n indicate whether the element is backed up (1) or not (0). In this case, a number of n+1 CMs 2 is installed in the storage apparatus 1. P(CM #0)+P(CM #1)+ . . . +P (CM #n) is the amount of power consumed during the backup of the CM 2 that is backed up. BBU #0 to BBU #m indicate whether the BBU 3 is normal (1) or not (0). 1P(BBU #0-m) is the sum of the power of the normal BBU 3. The symbol "Current" indicates the current value, and "Full" indicates the value when charging is completed. The symbol "Usability" indicates whether the pattern is available ("OK") or not ("NG") from the current amount of power of the BBU 3. The symbol "Note" is a comment.

For example, in the pattern identified as "pattern #0," all CMs 2 are backed up. Since the amount of power consumed when backing up all CMs 2 is 105, and the current charging amount is 57.6, this pattern may not be used. Also, this pattern is a default. In this example, since cache memory may not be backed up, the storage apparatus 1 is used in the write-through mode when this pattern is adopted.

The performance request table is a table indicating the user's performance request. FIG. 8 is a diagram illustrating an example of the performance request table. As illustrated in FIG. 8, the performance request table includes a type name, a shortest cache usable time, a cache size enlargement, an operational stability of the device, and an importance of battery life. The type name is a name that identifies the type of performance request.

The shortest cache usable time is a setting that minimizes the time required until the cache memory may be used after the backup discharge. By this setting, the time from the write through to the write back may be shortened. The cache size enlargement is a setting that enlarges the size of the user cache area to a capacity larger than the specified size. The operational stability of the device is set to ensure the operational stability of the storage apparatus due to the redundant operation of the battery within the range of the backup power. The importance of battery life is a setting that extends the battery life and the charging rate is adjusted, for example, so as not to use the battery at a full charge. The user's performance request is represented by the scores of the shortest cache usable time, the cache size enlargement, the operational stability of the device, and the importance of battery life. The total number of scores is 100. As the score of each performance element (entry) becomes higher, the level of performance required by the user becomes higher. Also, the score of each performance element is used as the coefficient of the calculation to be made when determining the pattern. Thus, when the condition of the amount of power is satisfied, the pattern may be determined depending on the type of performance request.

For example, in a default, the score of the operational stability of the device is 70, and the score of the other performance element is 10. Therefore, in the default case, all the CMs 2 are backed up with a pattern in which the operational stability of the device is emphasized. In type #1, the score of the cache usage is 70, and the score of the other performance element is 10. Therefore, in type #1, a pattern is adopted in which the shortest cache usable time is emphasized, and when the backup power amount becomes equal to or greater than the power amount of backing up one CM 2, only one CM 2 is backed up.

The performance request table is generated by the GUI circuit 36 based on the instruction input from the user by referring to the GUI screen by the user. In addition, as the score of the entry in the performance request table, except for the default, becomes higher, the level of the performance request of the user becomes higher.

Figure 9:
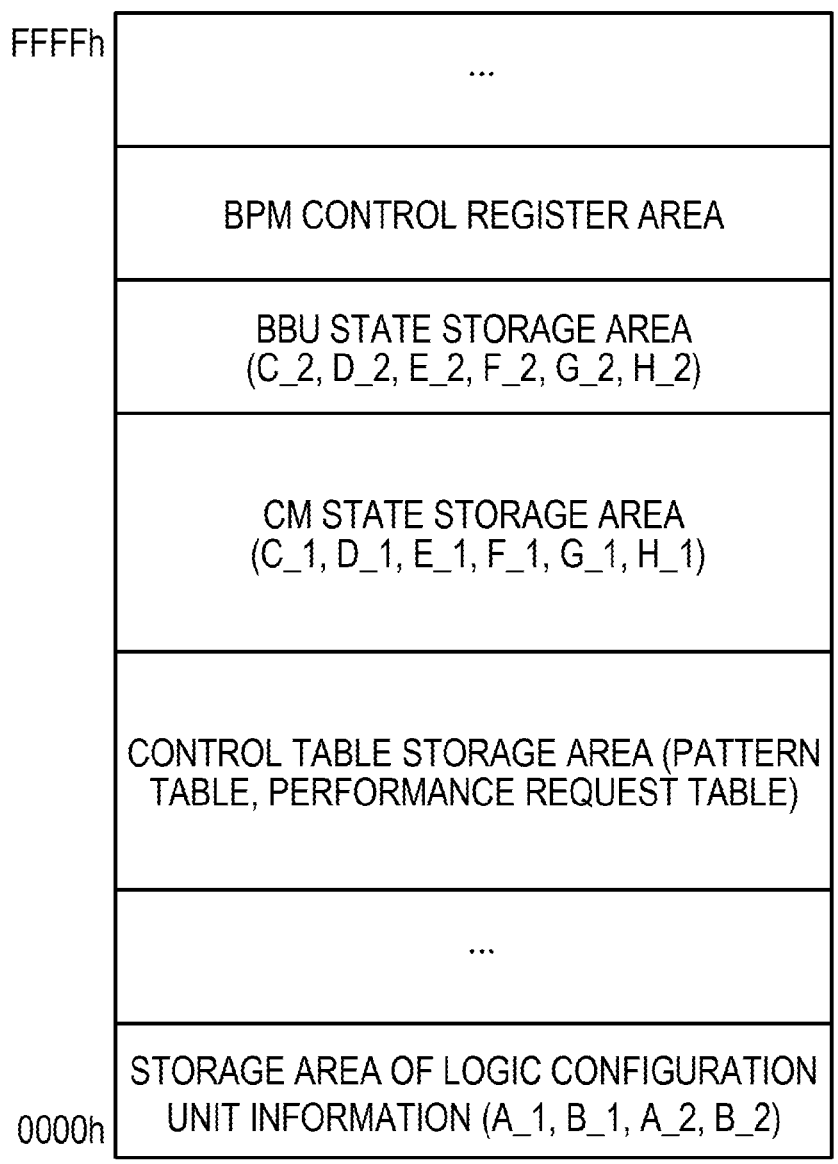
FIG. 9 is a diagram illustrating an example of a storage area of a configuration table memory.

FIG. 9 is a diagram illustrating an example of a storage area of a configuration table memory 30. As illustrated in FIG. 9, the configuration table memory 30 includes a logic configuration unit information storage area, a control table storage area, a CM state storage area, a BBU state storage area, and a BPM control register area.

The storage area of the logic configuration unit information is an area that stores information related to the logic configuration of the storage apparatus 1. In this area, A_1 and B_1 of the CM configuration table and A_2 and B_2 of the BBU configuration table are stored. The control table storage area is an area that stores information on the pattern table and the performance request table.

The CM state storage area is an area that stores information on the CM 2. In this area, information other than A_1 and B_1 of the CM configuration table is stored. The BBU state storage area is an area that stores information related to the BBU 3. In this area, information other than A_2 and B_2 in the BBU configuration table is stored. The BPM control register area stores information that the BPM 21 uses for its own control.

Returning back to FIG. 4, the power amount calculation circuit 31 calculates the amount of power consumed when backing up the CM 2 mounted on the storage apparatus 1, and the total amount of power that may be supplied by the BBU 3 mounted on the storage apparatus 1.

Specifically, the power amount calculation circuit 31 calculates the backup operation time of each CM 2 by the formula of F_1/G_1 using F_1 (user cache size) and G_1 (acceleration rate) of the CM configuration table. Also, the power amount calculation circuit 31 calculates the amount of power consumed P (CM) when backing up each CM 2 by the formula of P(CM)=D_1×(F_1/G_1) using the backup operation time F_1/G_1 of the CM 2 and D_1 (power consumption) of the CM configuration table.

The power amount calculation circuit 31 calculates the amount of power that each BBU 3 may supply P(BBU) by the formula of P(BBU)=C_2×D_2×E_2 using the C_2 (current capacity), D_2 (voltage), and E_2 (SoC) of the BBU configuration table.

For example, when a number of (n+1) CMs 2 is mounted on the storage apparatus 1, the power amount calculation circuit 31 calculates as follows.

[Equation 1]

$$\text{Amount of power consumption required to back up the device on which } (n+1)CMs \text{ are mounted} = \sum_{i=1}^{n} P(CM\#i) \quad (1)$$

Further, when, for example, the number of (m+1) BBUs 3 is mounted on the storage apparatus 1, the power amount calculation circuit 31 calculates as follows.

[Equation 2]

$$\text{Total amount of power that } (m+1) \text{ BBUs mounted on the device may supply} = \sum_{i=1}^{m} P(BBU\#i) \quad (2)$$

The condition that the (n+1) CM 2 may be backed up to the (m+1) BBU 3 is as follows.

[Equation 3]

$$\sum_{i=1}^{n} P(CM\#i) < \sum_{i=1}^{m} P(BBU\#i) \quad (3)$$

The determination circuit 32 generates a pattern table using the information of the CM configuration table, the information of the BBU configuration table, and the calculation result by the power amount calculation circuit 31. Then, the determination circuit 32 selects a usable pattern from the pattern table based on the entry of the performance request table, and determines the ON/OFF of each switch to correspond to the selected pattern. The switch is arranged in a path connecting the BBU 3 and the CM 2.

For example, when there is a backup power amount sufficient to back up one CM 2 because the weight of the score of the shortest possible time of the cache memory usable time is the highest, the determination circuit 32 determines the turning ON/OFF of each switch so as to supply power to only one CM 2. In addition, when the weight of the scores of importance of the operational stability of the device is set to be high, the determination circuit 32 determines the turning ON/OFF of each switch so as to supply power to the entire CM 2 mounted on the storage apparatus 1. In addition, the determination circuit 32 places importance on increasing the size of the user cache, and when there is a backup power amount sufficient to back up one CM 2, the determination circuit 32 determines the turning ON/OFF of each switch so as to supply power to only one CM 2.

The SW control circuit 33 controls each switch based on the ON/OFF determined by the determination circuit 32. The BBU monitoring circuit 34 periodically monitors the charging rate of the BBU 3 mounted on the storage apparatus 1 and updates the pattern table. The failure detection circuit 35 detects the failure of the storage apparatus 1 and updates the pattern table when a failure is detected in the CM 2 or the BBU 3.

Figure 10:
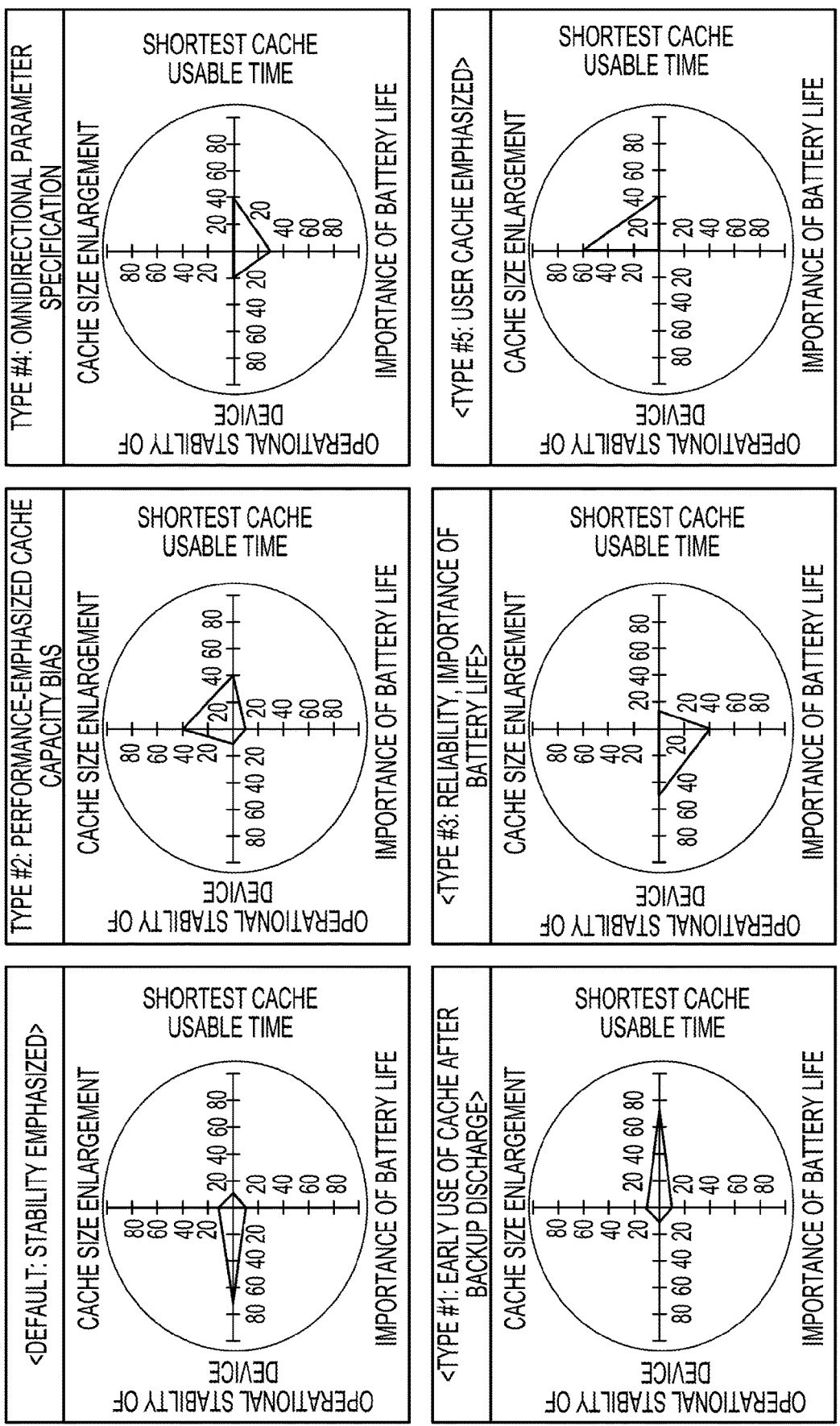
FIG. 10 is a diagram illustrating an example of a screen that causes a user to designate a performance request.

The GUI circuit 36 displays a screen that designates a performance request to the user on a display device, receives the performance request from the user, and generates the performance request table. FIG. 10 is a diagram illustrating an example of a screen that causes a user to designate a performance request.

As illustrated in FIG. 10, the GUI circuit 36 displays the scores of the performance elements in terms of the shortest possible time of the cache usable time, the cache size enlargement, the operational stability of the device, and the importance of battery life with respect to the default and types #1 to #5. Here, the default emphasizes the stability of the device, type #1 indicates the early use of the cache after the backup discharge, type #2 indicates a performance-emphasized cache capacity bias, type #3 emphasizes reliability and battery life, type #4 indicates an omnidirectional parameter specification, and type #5 emphasizes the user cache.

The user may specify the score of each performance element as in the default or types #1 to #5. Therefore, the score is not limited to the shape of the polygon illustrated in FIG. 10. Then, the GUI circuit 36 registers the score of each performance element in the performance request table in accordance with the user's instruction input.

Further, the BPM 21 includes a micro processing unit (MPU), a flash memory, and a random access memory (RAM). The MPU then implements the functions illustrated in FIG. 4 by loading the backup program stored in the flash memory into the RAM, reading the backup program from the RAM, and executing the backup program.

Figure 11A:
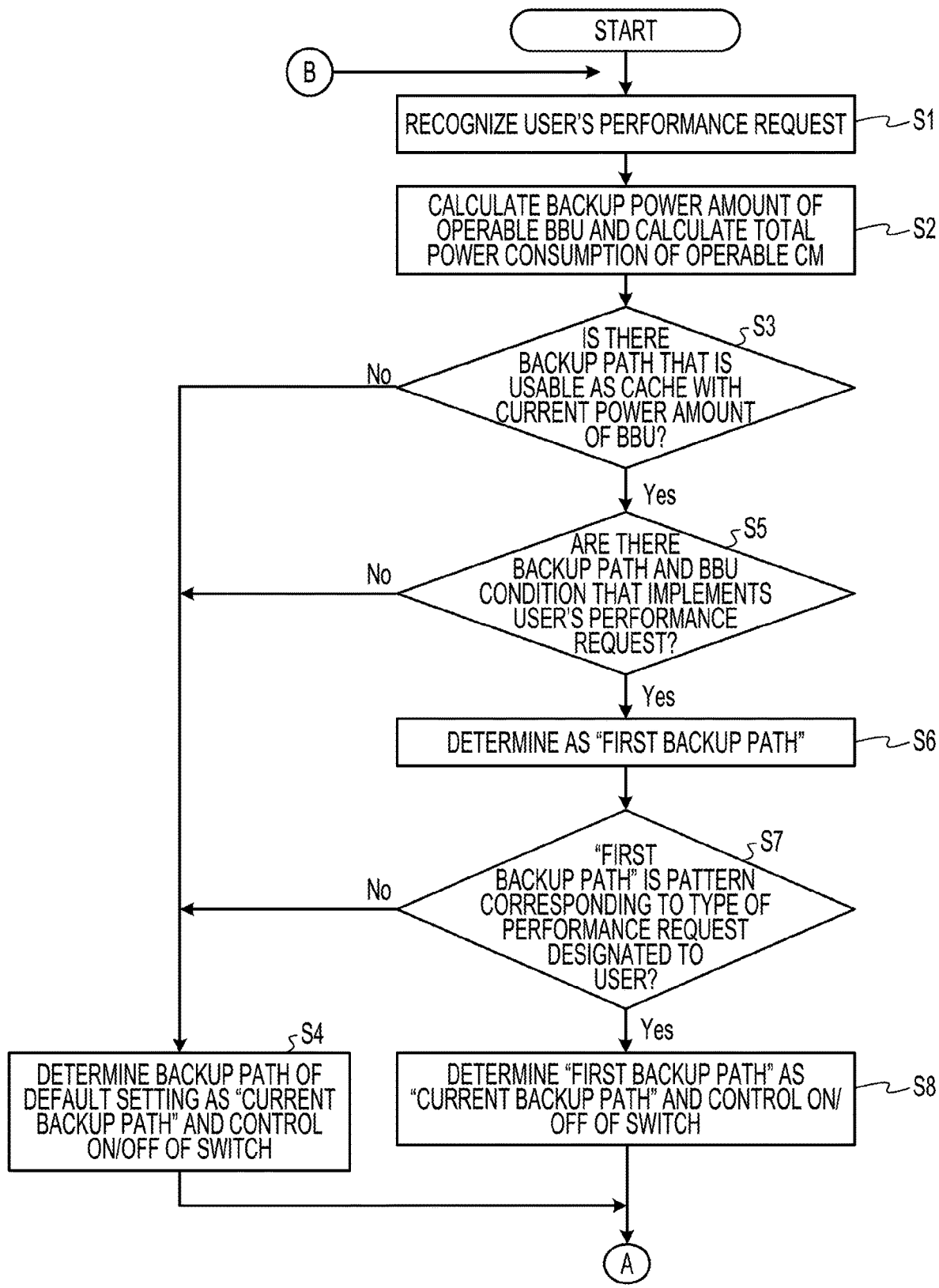
FIGS. 11A and 11B are flowcharts illustrating the flow of a BPM operation from the start of a storage apparatus.
Figure 11B:
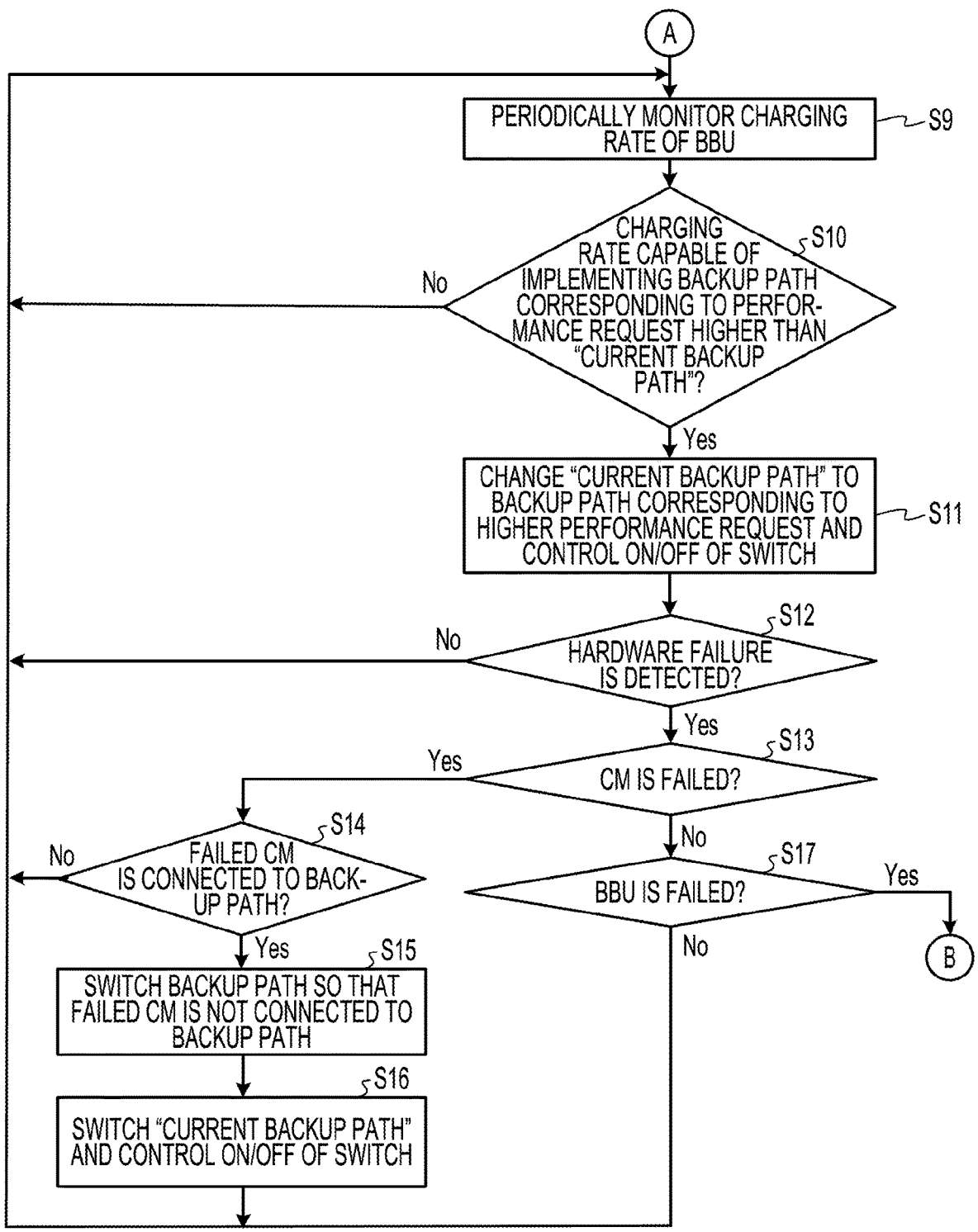

Next, the flow of the operation of the BPM 21 from the start of the storage apparatus 1 will be described. FIGS. 11A and 11B are flowcharts illustrating the flow of the operation of the BPM 21 from the start of the storage apparatus 1. As illustrated in FIG. 11A, the BPM 21 recognizes the user's performance request (step S1). Here, the user's performance request is registered in the performance request table illustrated in FIG. 8.

The BPM 21 calculates the backup power amount of the BBU 3 that may be operated and the total power consumption amount of the CM 2 that may be operated (step S2). Then, the BPM 21 determines whether there is a backup path that may be used as a cache by the current power amount of the BBU 3 (step S3). Here, when there is a backup power amount sufficient to back up one CM 2, the cache memory of one CM 2 becomes available.

Then, when there is no backup path available as a cache on the power amount of the BBU 3, the BPM 21 determines the backup path of the default setting as the "current backup path" and controls ON/OFF of the switch (step S4). Then, the BPM 21 proceeds to step S9.

In the meantime, when there is a backup path that may be used as a cache by the current power amount of the BBU 3, the BPM 21 determines whether there are a backup path and a BBU condition that may implement the user's performance request (step S5). Then, when there are no backup path and BBU condition that may implement the user's performance request, the BPM 21 proceeds to step S4.

In the meantime, when there are the backup path and the BBU condition that may implement the user's performance request, the BPM 21 determines the existing backup path as the "first backup path" (step S6). The BPM 21 then determines whether the "first backup path" is a pattern corresponding to the type of performance request designated by the user (step S7). The pattern corresponding to the type of performance request is determined by the weight of the score of each performance element as described above.

When the "first backup path" is not a pattern corresponding to the type of performance request designated by the user, the BPM 21 proceeds to step S4. When the "first backup path" is a pattern corresponding to the type of performance request designated by the user, the BPM 21 determines the "first backup path" as the "current backup path" and controls the ON/OFF of the switch (step S8).

Further, when the BBU 3 is charged, the BPM 21 periodically monitors the charging rate of the BBU 3, as illustrated in FIG. 11B (step S9). The BPM 21 then determines whether the charging rate of the BBU 3 is the charging rate that may implement the backup path corresponding to the higher performance request than the "current backup path" (step S10). When the charging rate is not the charging rate that may implement the backup path corresponding to the higher performance request than the "current backup path," the BPM 21 returns to step S9.

In the meantime, when the charging rate is the charging rate that may implement the backup path corresponding to the higher performance request than the "current backup path," the BPM 21 changes the "current backup path" to a backup path corresponding to a higher performance request, and controls the ON/OFF of the switch (step S11). Then, the BPM 21 determines whether a hardware failure has been detected (step S12), and when the hardware failure has not been detected, the BPM 21 returns to step S9.

In the meantime, when a hardware failure has been detected, the BPM 21 determines whether the failure has occurred in the CM 2 (step S13), and when the failure has occurred in the CM 2, the BPM 21 determines whether the failed CM 2 is connected to the backup path (step S14). Then, when the failed CM 2 is not connected to the backup path, the BPM 21 returns to step S9.

In the meantime, when the failed CM 2 is connected to the backup path, the BPM 21 switches the backup path so that the failed CM 2 is not connected to the backup path (step S15). Then, the BPM 21 changes the "current backup path" to the switched backup path, and controls the ON/OFF of the switch (step S16).

In step S13, when the failure is not in the CM 2, the BPM 21 determines whether the failure has occurred in the BBU 3 (step S17). When the failure has occurred in the BBU 3, the BPM 21 returns to step S1, and when the failure has not occurred in the BBU 3, the process returns to step S9.

In this way, the BPM 21 periodically monitors the charging rate of the BBU 3 and when the user reaches the charging rate at which the desired performance request may be implemented, the BPM 21 changes the backup path to the backup path corresponding to the performance request and may perform a backup control according to the backup power state.

As described above, in the present embodiment, the power amount calculation circuit 31 calculates the amount of power consumed when backing up the CM 2 mounted on the storage apparatus 1, and the total amount of power that may be supplied by the BBU 3 mounted on the storage apparatus 1. Then, the determination circuit 32 generates a pattern table using the calculation result of the CM configuration table, the BBU configuration table, and the power amount calculation circuit 31. The determination circuit 32 then selects, from the pattern table, a pattern that is available as the pattern corresponding to the type corresponding to the highest desired user entry among the entries of the performance request table, and determines the ON/OFF of each switch to correspond to the selected pattern. Then, the SW control circuit 33 controls each switch based on the ON/OFF state determined by the determination circuit 32. Therefore, the BPM 21 may control the backup path based on the state of the device such as the user's performance request, the state of the BBU 3, and the state of the CM 2.

In addition, in the embodiment, the failure detection circuit 35 detects a failure of the storage apparatus 1. Then, the determination circuit 32 updates the "current backup path" based on the failure location. Therefore, the BPM 21 may control the backup path based on the state of the CM 2.

In addition, in the embodiment, the BBU monitoring circuit 34 periodically monitors the charging rate of the BBU 3, and the determination circuit 32 updates the "current backup path" based on the charging rate of the BBU 3.

Therefore, the BPM 21 may control the backup path based on the charging state of the BBU 3.

In the embodiment, when the user designates an early use of the cache memory as the type of the performance request, the determination circuit 32 selects a pattern that backs up only one CM 2 when the backup power amount is equal to or greater than the power amount required to back up one CM 2. Therefore, the BPM 21 may control the backup path so that the cache memory may be used in an early stage.

In the embodiment, when the user designates the use of a relatively large user cache as a performance request, the determination circuit 32 selects a pattern for backing up only one CM 2 when the backup power amount is equal to or greater than the power amount required to back up one CM 2. Therefore, the BPM 21 may control the backup path to use a relatively large user cache having a predetermined capacity or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
   a determination circuit configured to determine a path between one of a plurality of backup power sources and one of a plurality of backup target circuits, each of the plurality of backup target circuits including a memory based on configuration information, state information of the storage apparatus, and setting information of performance request for the storage apparatus;
   a plurality of switches arranged between the plurality of backup target circuits and the plurality of backup power sources; and
   a control circuit configured to control the switches to couple the backup target circuit to the backup power source via the path determined by the determination circuit,
   each of a plurality of storage control apparatuses that control the storage apparatus includes the backup target circuit, and
   when an early use of a cache memory is set as the performance request setting information and the amount of power of the backup power source is equal to or greater than an amount of power of backing up one storage apparatus, the determination circuit determines the path so that one of the plurality of storage control apparatuses is coupled to the backup power source.

2. The storage apparatus according to claim 1, further comprising
   a detection circuit configured to detect a failure location of the backup power source and the backup target circuit, and update the state information,
   wherein the determination circuit determines the path based on the failure location.

3. The storage apparatus according to claim 1, further comprising
   a monitoring circuit configured to monitor an amount of power that is supplied by the backup power source at a predetermined interval,
   wherein the determination circuit determines the path based on the amount of power.

4. A storage apparatus according to claim 1, wherein comprising:
   a determination circuit configured to determine a path between one of a plurality of backup power sources and one of a plurality of backup target circuits, each of the plurality of backup target circuits including a memory based on configuration information, state information of the storage apparatus, and setting information of performance request for the storage apparatus;
   a plurality of switches arranged between the plurality of backup target circuits and the plurality of backup power sources; and
   a control circuit configured to control the switches to couple the backup target circuit to the backup power source via the path determined by the determination circuit,
   each of a plurality of storage control apparatuses that control the storage apparatus includes the backup target circuit, and
   when a use of a user cache having a predetermined capacity or more is set as the performance request setting information and the amount of power of the backup power source is equal to or greater than an amount of power of backing up one storage apparatus, the determination circuit determines the path so that one of the plurality of storage control apparatuses is coupled to the backup power source.

* * * * *